UNITED STATES PATENT OFFICE.

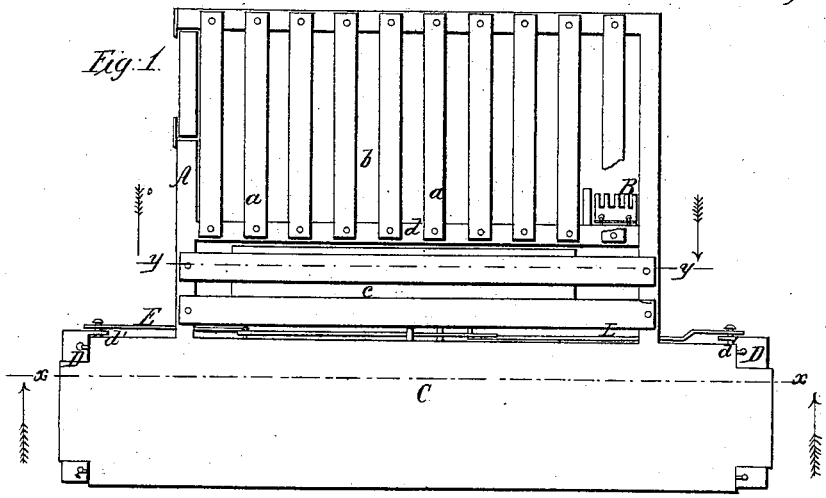
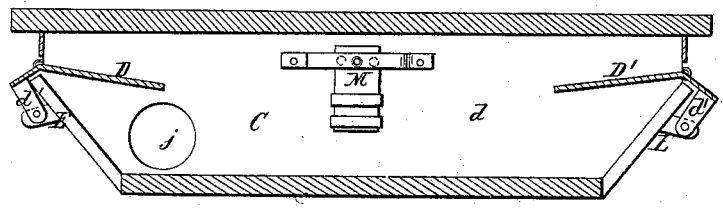
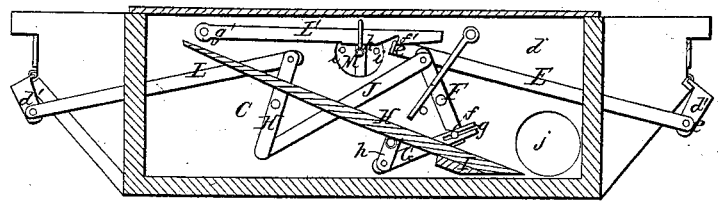
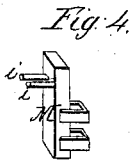

G. E. CLARKE, OF RACINE, WISCONSIN, ASSIGNOR TO HIMSELF AND SYLVESTER BULLEN, OF SAME PLACE.

IMPROVEMENT IN ANIMAL-TRAPS.

Specification forming part of Letters Patent No. 51,777, dated December 26, 1865.

*To all whom it may concern:*

Be it known that I, G. E. CLARKE, of Racine, in the county of Racine and State of Wisconsin, have invented a new and Improved Animal-Trap; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a longitudinal vertical section of the same, taken in the line $x\ x$, Fig. 1; Fig. 3, longitudinal vertical section of the same, taken in the line $y\ y$, Fig. 1; Fig. 4, a detached perspective view of a part pertaining to the same.

Similar letters of reference indicate corresponding parts.

This invention relates to a new and improved animal-trap, designed more especially for catching rats and mice, and of that class which are self-setting.

The object of the invention is to obtain a trap of the class specified which will operate perfectly without the application of either weights or springs, and which will be simple in construction, and therefore not liable to get out of repair.

A represents a box, which may be of rectangular form and of any suitable dimensions, havings its top formed of slats $a$ for the purpose of admitting light and air and enabling a person to see its interior. This box A is divided into two compartments, $b\ c$, by a partition, $d$, the compartment $b$ being considerably larger than $c$, and forming the animal-receptacle, and communicating with $c$ by means of an inclined flap or door, B, which will enable an animal to pass from $c$ into $b$, but not to return from $b$ into $c$. These flaps or trap-doors are quite common and well-known, and therefore do not require a minute description.

C represents a narrow box, which is secured to the box A and adjoins the compartment $c$. This box C has a flap or door at each end (represented by D D') hung or suspended at their upper ends and opening inward, as shown clearly in Fig. 2. Each door has an arm, $d'$, projecting downward from its upper end, and to the arm of the door D there is attached, by a pivot, $e$, a bar, E, which extends into the compartment $c$, and is connected near its end by a pivot to a lever, F, the lower end of which has a pin, $f$, made longitudinally in one end of a bar, G, the opposite end of G being pivoted to an arm, $h$, which projects downward at right angles from an inclined platform or treadle, H, (see Fig. 3,) which treadle has a weight, I, attached to one end, to keep it in an inclined position when not acted upon by the animal. The upper end of the lever F is connected by a bar, J, with the lower end of a similar lever, K, the upper end of the latter being connected by a bar, L, with the arm $d'$ of the door D'. By this arrangement the two doors D D' are connected in such a manner that they will open and close simultaneously, one not moving without the other, and it will be seen by referring to Fig. 3 that, owing to the connection of the platform or treadle H to the lever F, the doors D D', when down, will be elevated by depressing the platform or treadle. The inner end of the bar E is bent to form a hook, $e$, to catch into a notch, $f'$, in a bar, L', which is secured at one end by a pivot, $g'$, to the inner side of the box C and within the compartment $c$ of the box A. By this means the doors D D' are retained in an open state.

M represents a pendent bar, which is fitted within the box C, working freely on a pivot, $h$, and having the bait secured to it. This bar M has two pins, $i\ i$, projecting from it through an opening in the box C and extending underneath the bar L, and a hole, $j$, is made in the side of box C to communicate with the compartment $c$ of box A at the lower end of the platform or treadle H.

The operation is as follows: The bait is attached to the pendent bar M and the doors D D' are opened or raised and retained in that position by the bar L' engaging with the bar E, as shown in Fig. 3. An animal, on entering the box C, attracted by the bait attached to M, will, in nibbling the bait, move the bar M, and one of the pins $i$ will raise the bar L' and liberate the bar E, and the doors D D' will then fall and confine the animal within C. The animal, finding himself entrapped, endeavors to escape, and, seeing no other opening, passes through $j$ into the compartment $c$ and runs up the platform or treadle H, which tilts under its weight, and in so doing actuates the lever F through the medium of bar G and opens or raises the doors D D', the bar E being caught by the bar L and the doors held open as before, and the trap consequently reset. The animal then passes through the flap or door B into the compartment b.

Thus it will be seen that a very simple self-setting trap is obtained, one in which all springs and weights are avoided, and consequently will not be liable to get out of repair.

I am aware that traps have been before constructed so as to be reset by the action of the entrapped animal without the aid of springs or weights; but

What I claim, and desire to secure by Letters Patent, is—

The combination of the pivoted bar H, levers $h$ F K $d'$ $d'$, connecting-bars G E L, and doors D D', when arranged as and for the purposes specified.

G. E. CLARKE.

Witnesses:
 N. H. JOY,
 E. P. THOMAS.